(12) United States Patent
Larose, Jr. et al.

(10) Patent No.: US 9,046,016 B2
(45) Date of Patent: Jun. 2, 2015

(54) SYSTEM AND METHOD FOR PARTICULATE FILTER REGENERATION

(71) Applicant: GM GLOBAL TECHNOLOGY OPERATIONS LLC, Detroit, MI (US)

(72) Inventors: Thomas Larose, Jr., Howell, MI (US); John A. Catalogna, Commerce Township, MI (US); Jianwen Li, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 268 days.

(21) Appl. No.: 13/672,046

(22) Filed: Nov. 8, 2012

(65) Prior Publication Data
US 2014/0123627 A1 May 8, 2014

(51) Int. Cl.
*F01N 3/023* (2006.01)

(52) U.S. Cl.
CPC . *F01N 3/023* (2013.01); *Y02T 10/47* (2013.01)

(58) Field of Classification Search
CPC ....... F01N 3/023; F01N 3/0253; F01N 9/002; F02D 41/029
USPC .................... 60/286, 295, 297, 311
See application file for complete search history.

(56) References Cited

U.S. PATENT DOCUMENTS

2007/0130921 A1* 6/2007 Yezerets et al. ................ 60/295
2011/0252770 A1 10/2011 Heibel et al.

* cited by examiner

*Primary Examiner* — Kenneth Bomberg
*Assistant Examiner* — Jonathan Matthias
(74) *Attorney, Agent, or Firm* — Cantor Colburn LLP

(57) ABSTRACT

In one exemplary embodiment of the invention, a method for controlling regeneration for an exhaust system including a particulate filter is provided, where the method includes determining a mass flow rate of oxygen, determining a particulate mass, providing information describing desired set point temperatures corresponding to oxygen mass flow rates and particulate mass values and determining a temperature set point for exhaust gas entering the particulate filter based on the mass flow rate of oxygen, the particulate mass and the information describing desired set point temperatures corresponding to oxygen mass flow rates and particulate mass values. The method further includes communicating a signal to control a parameter for at least one selected from the group consisting of: a hydrocarbon injector, a heating device and a fuel injector configured to provide hydrocarbon post-injection to a cylinder of the internal combustion engine, the controlling based on the determined temperature set point.

20 Claims, 3 Drawing Sheets

SYSTEM AND METHOD FOR PARTICULATE FILTER REGENERATION

FIELD OF THE INVENTION

The subject invention relates to internal combustion engines, and, more particularly, to exhaust aftertreatment systems for internal combustion engines.

BACKGROUND

An engine control module of an internal combustion engine controls the mixture of fuel and air supplied to combustion chambers of the engine. After the air/fuel mixture is ignited, combustion takes place and the combustion gases exit the combustion chambers through exhaust valves. The combustion gases are directed by an exhaust manifold to a catalyst (or "catalytic converter") and/or other exhaust aftertreatment components.

During engine operation, certain exhaust aftertreatment components are configured to remove selected regulated constituents from the exhaust gas. An exemplary component is a particulate filter configured to remove carbon particles or particulates that result from incomplete combustion of a hydrocarbon fuel, also referred to as particulates, from the exhaust gas. An exemplary particulate filter is configured to remove a selected amount of particulates and periodically burn off the accumulated particulates through a regeneration process. Regeneration and removal of excess particulates prevents excessive backpressure for the internal combustion engine, which can lead to repair and maintenance issues. In some cases, controlling the burn rate of particulates and corresponding temperature within the filter can be difficult, as a burn rate that is too high may cause a thermal runaway condition and a burn rate that is too low may cause an extended time for the regeneration process. The time it takes to perform a regeneration process should also be reduced as much as possible, as the regeneration process can adversely affect fuel economy of the engine.

SUMMARY OF THE INVENTION

In one exemplary embodiment of the invention, a method for controlling regeneration for an exhaust system of an internal combustion engine, wherein the exhaust system includes a particulate filter is provided, where the method includes determining a mass flow rate of oxygen received by the internal combustion engine, determining a particulate mass within the particulate filter and providing information describing desired set point temperatures corresponding to selected oxygen mass flow rates and selected particulate mass values. The method also includes determining a temperature set point for exhaust gas entering the particulate filter based on the mass flow rate of oxygen, the particulate mass and the information describing desired set point temperatures corresponding to selected oxygen mass flow rates and selected particulate mass values and communicating a signal, from a controller, to control a parameter for at least one selected from the group consisting of: a hydrocarbon injector, a heating device and a fuel injector configured to provide hydrocarbon post-injection to a cylinder of the internal combustion engine, the controlling based on the determined temperature set point.

In another exemplary embodiment of the invention, a system includes a particulate filter coupled to a conduit that receives an exhaust gas from an internal combustion engine and a controller coupled to an oxygen mass flow sensor, the controller configured to perform a method. The method performed includes determining a mass flow rate of oxygen received by the internal combustion engine, determining a particulate mass within the particulate filter, providing information describing desired set point temperatures corresponding to selected oxygen mass flow rates and selected particulate mass values, determining a temperature set point for exhaust gas entering the particulate filter based on the mass flow rate of oxygen, the particulate mass and the information describing desired set point temperatures corresponding to selected oxygen mass flow rates and selected particulate mass values and communicating a signal, from the controller, to control a parameter for at least one selected from the group consisting of: a hydrocarbon injector, a heating device and a fuel injector configured to provide hydrocarbon post-injection to a cylinder of the internal combustion engine, the controlling based on the determined temperature set point.

The above features and advantages and other features and advantages of are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION OF THE EMBODIMENTS

Figure 1:
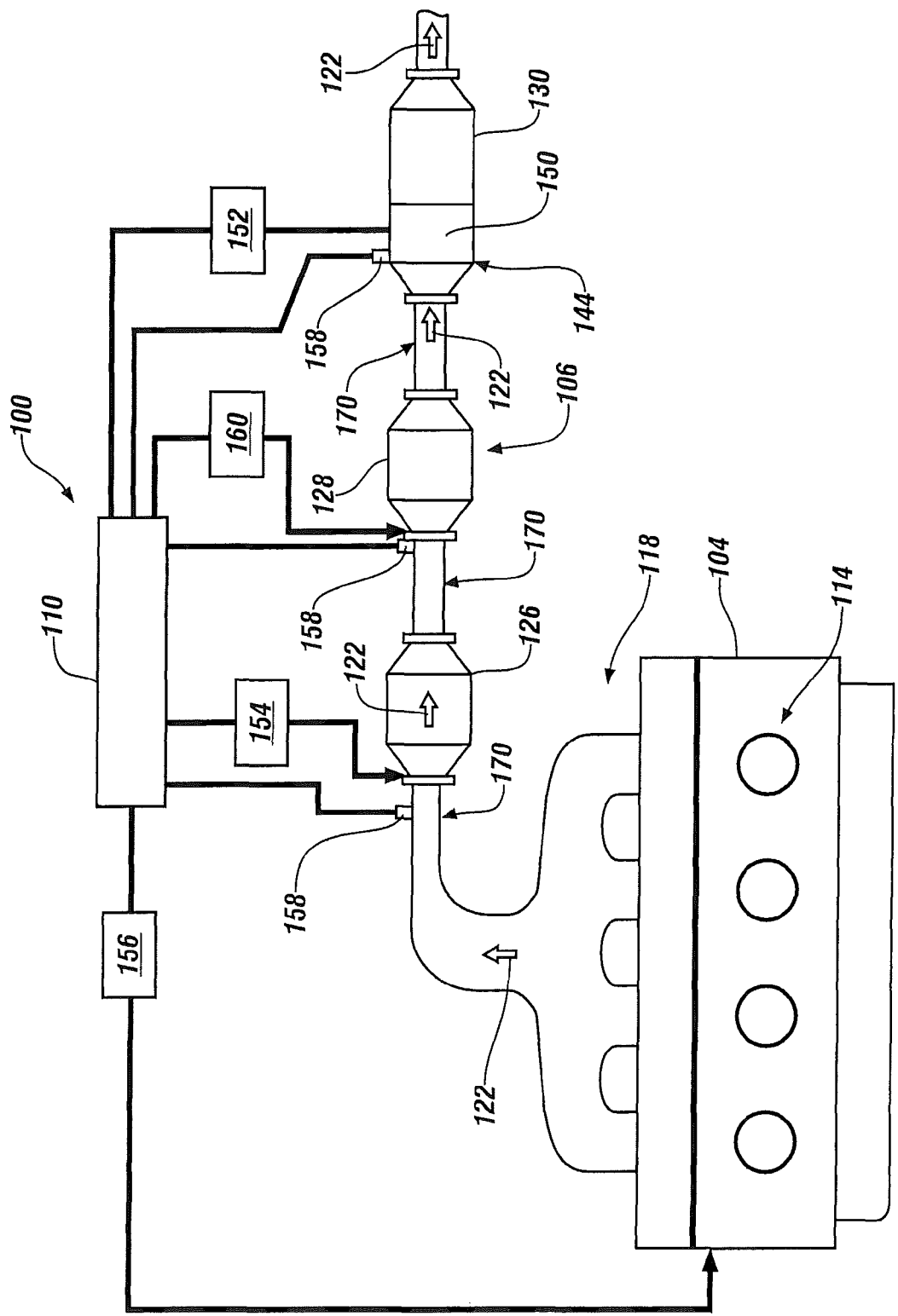
FIG. 1 illustrates an exemplary internal combustion engine including an exemplary exhaust aftertreatment system.

The following description is merely exemplary in nature and is not intended to limit the present disclosure, its application or uses. It should be understood that throughout the drawings, corresponding reference numerals indicate like or corresponding parts and features. As used herein, the terms controller and module refer to an application specific integrated circuit (ASIC), an electronic circuit, a processor (shared, dedicated, or group) and memory that executes one or more software or firmware programs, a combinational logic circuit, and/or other suitable components that provide the described functionality. In embodiments, a controller or module may include one or more sub-controllers or sub-modules.

In accordance with an exemplary embodiment of the invention, FIG. 1 illustrates an exemplary internal combustion engine 100, in this case an in-line four cylinder engine, including an engine block and cylinder head assembly 104, an exhaust system 106, and a control module 110 (also referred to as "controller"). The internal combustion engine 100 may be a diesel or spark ignition engine. Coupled to the engine block and cylinder head assembly 104 is an exhaust manifold 118. In addition, the engine block and cylinder head assembly 104 includes cylinders 114 wherein the cylinders 114 receive a combination of combustion air and fuel supplied from a fuel system 156. The combustion air/fuel mixture is combusted resulting in reciprocation of pistons (not shown) located in the cylinders 114. The reciprocation of the pistons rotates a crankshaft (not shown) to deliver motive power to a powertrain (not shown) in a vehicle or to a generator or other stationary recipient of such power (not shown) in the case of a stationary application of the internal combustion engine 100. The combustion of the air/fuel mixture causes a flow of exhaust gas 122 through the exhaust manifold 118 and into the exhaust system 106.

The exhaust gas 122 flows through the exhaust system 106 for the removal or reduction of exhaust gas constituents and is then released into the atmosphere. The exhaust system 106 may include catalyst devices, such as oxidation catalyst ("OC") device 126 and selective catalytic reduction ("SCR") device 128, as well as a particulate filter ("PF") 130. Fluid communication between the catalyst devices is provided by passages or conduits 170. The OC device 126 may include, for example, a flow-through metal or ceramic monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits or passages. The oxidation catalyst compound may be applied as a wash coat and may contain platinum group metals such as platinum (Pt), palladium (Pd), rhodium (Rh) or other suitable oxidizing catalysts. The SCR device 128 may also include, for example, a flow-through ceramic or metal monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits. The substrate can include an SCR catalyst composition applied thereto. The SCR catalyst composition may contain a zeolite and one or more base metal components such as iron (Fe), cobalt (Co), copper (Cu) or vanadium (V) which can operate efficiently to convert NOx constituents in the exhaust gas 122 in the presence of a reductant such as ammonia ($NH_3$). An $NH_3$ reductant may be supplied from a fluid supply 160 (reductant supply) and may be injected into the exhaust gas 122 at a location upstream of the SCR device 128 using an injector. The reductant may be in the form of a gas, a liquid, or an aqueous urea solution and may be mixed with air in the injector to aid in the dispersion of the injected spray.

The PF 130 may be disposed downstream of the SCR device 128. The PF 130 operates to filter the exhaust gas 122 of carbon and other particulates. In embodiments, the PF 130 may be constructed using a ceramic wall flow monolith filter that is wrapped in an intumescent mat or other suitable support that expands when heated, securing and insulating the filter. The filter may be packaged in a shell or canister that is, for example, stainless steel, and that has an inlet and an outlet in fluid communication with exhaust gas conduits. The ceramic wall flow monolith filter may have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 122 entering the filter through the inlet ends of the inlet passages is forced to migrate through adjacent longitudinally extending walls to the outlet passages. It is through this exemplary wall flow mechanism that the exhaust gas 122 is filtered of carbon (soot) and other particulates. The filtered particulates are deposited on the longitudinally extending walls of the inlet passages and, over time, will have the effect of increasing the exhaust gas backpressure experienced by the internal combustion engine 100.

It should be understood that the ceramic wall flow monolith filter is merely exemplary in nature and that the PF 130 may include other filter devices such as wound or packed fiber filters, open cell foams, sintered metal fibers, etc. It should also be noted that the arrangement and number of the exhaust system devices may vary, where the devices include the OC 126, SCR device 128 and PF 130. In addition, other devices may be includes in the system in addition to the depicted devices, while some of the depicted exhaust devices may be removed in some embodiments.

The accumulation of particulate matter within the PF 130 is periodically cleaned, burned off or regenerated to reduce backpressure. Regeneration involves the oxidation or burning of the accumulated carbon and other particulates (also referred to as "soot") in what is typically a high temperature (e.g., at or above 600° C.) environment. In an embodiment, an elevated soot level is sensed in the PF 130 and a regeneration process may be performed. In an embodiment, the control module 110 determines loading of soot in the PF 130 by a measurement of pressure or another parameter, where the soot load may be represented by a soot mass parameter. The regeneration process may involve several components and have one or more stages. In one embodiment, the regeneration process includes an introduction of excess thermal energy into the exhaust aftertreatment system 106 by introducing fuel (hydrocarbons or HC) via an injector, such as hydrocarbon injector ("HCI") 154 directly into the exhaust gas 122 as it flows into catalysts, such as OC device 126 and SCR device 128. A selected amount of fuel is directed from the HCI 154 into the exhaust gas 122 and is oxidized in an exothermic reaction in the OC device 126, causing an increase in the temperature of the exhaust gas flow 122 into the PF 130. In the depicted embodiment, the control module 110 is coupled to the HCI 154 and is configured to control the amount of fuel to be directed into the exhaust gas flow 122, wherein the resulting increased exhaust gas temperature burns the trapped soot particles downstream within the PF 130.

In an embodiment, the regeneration process may include a heating device 150 controlled by the control module 110, wherein operation of the heating device 150 is based on sensed elevated soot levels. When the determined soot level achieves a threshold level (e.g., 5 grams/liter of soot) and the exhaust flow rate is within a desired range, the control module controls a current or voltage sent to the heating device 150 (e.g., control of a voltage applied to a resistance heater) via a power source 152 to initiate the regeneration process. The heating device 150 may be constructed of any suitable material that is electrically conductive such as a wound or stacked metal monolith. The power source 152 is connected to an electrical system, such as a vehicle electrical system, and supplies electricity to the heating device 150. The heating device 150, when heated, increases the temperature of exhaust gas 122 passing through the heating device 150 and/or increases the temperature of portions of the PF 130 at or near the heating device 150. The duration of the regeneration process varies based upon the amount of particulate matter within the PF 130. In one aspect, current is only applied during an initial portion of the regeneration process. More specifically, the current is directed to the heating device 150 which heats the inlet of the PF 130 for a selected period (e.g., 1-2 minutes). The remainder of the regeneration process is achieved using the heat generated by combustion of particulate matter present in the PF 130.

Regeneration methods may also involve the injection of fuel into the exhaust gas flow 122 after the main combustion event within the cylinders 114. This process may be referred to as post-injection or late post-injection of fuel, wherein fuel injectors in the fuel system 156 provide the selected amount of fuel into cylinders 114 to add to the exhaust gas flow 122 for combustion within the exhaust system 106. This method may be used as a sole means for regeneration in some cases and may be used in addition to other regeneration processes in other cases. Further, each of the regeneration processes described herein may be used alone or in combination, depending upon system constraints. Referring back to post-injection, the post-combustion injected fuel is oxidized in the OC device 126, in the exhaust system 106. The heat released from the oxidation increases the exhaust temperature, which burns the trapped soot particles in the PF 130. The control module 110 controls the amount of fuel provided by the fuel system 156 during the post-injection process. The selected amount of fuel injected for post-injection may be determined by the control module 110 based on various information, such as determined parameters (e.g., exhaust gas temperatures, soot levels), component specifications and system configuration information.

In an exemplary internal combustion engine 100, the control module 110 is in signal communication with the power source 152, HCI 154, the fuel system 156, sensors 158, and the exhaust system 106, wherein the control module 110 is configured to use various signal inputs to control various processes. In embodiments, the control module 110 is coupled to and configured to receive signal inputs from sensors 158 that includes information, such as temperature (intake system, exhaust system, engine coolant, ambient, etc.), pressure, exhaust flow rates, soot levels, NOx concentrations, exhaust gas constituencies (chemical composition) and other parameters. The control module 110 is configured to perform selected processes or operations based on the sensed parameters, such as regeneration processes based on elevated soot levels in the PF 130. Exemplary sensors 158 are positioned at an inlet of the OC device 126, an inlet of the SCR device 128 and proximate an inlet 144 of the PF 130.

In embodiments, the control module 110 controls at least one regeneration system, including but not limited to, the post-injection process via fuel system 156, HCI 154 and heating device 150, to control regeneration of the PF 130. Specifically, the control module may change a parameter relating to the regeneration process to control exhaust gas 122 temperature entering the PF 130, thus providing improved regeneration efficiency. The parameter changed may include, but is not limited to, changing a flow rate for the fuel system 156 or HCI 154 and changing the current or power sent to heating device 150. In an embodiment, the control module 110 hosts one or more programs that use parameters as inputs, such as determined parameters, to determine a target or set point temperature for exhaust gas 122 entering the PF 130 for regeneration. In embodiments, depending on system configuration, the exhaust gas temperature set point may be determined for any location between an outlet of the oxidation catalyst 126 and the PF inlet 144.

In an embodiment, the determined set point temperature is an exhaust gas temperature at which the regeneration process burns soot most efficiently, thereby providing shorter regeneration times while also reducing incidence of thermal runaway.

In one embodiment, the set point temperature is determined and compared to a value measured by the sensor 158 proximate PF inlet 144. The control module 110 may then adjust components involved in the regeneration process, referred to as a regeneration system or regeneration components, such as fuel system 156, HCI 154 and heating device 150, to change the exhaust gas 122 temperature at the inlet 144. Embodiments provide an improved method for determining the set point temperature for exhaust gas entering the PF 130 during regeneration. In embodiments, a model is established by logging test data with one or more configuration of one or more exhaust system, where the control module 110 uses the model to determine the set point temperature based on one or more inputs. In embodiments, the method and system provide flexibility in determining the burn rate for a variety of exhaust system 106 configurations. For example, the method and system may be used to determine a set point temperature for an exhaust system with a first distance between the PF 130 and engine block cylinder head assembly 104 and sharing the same components as a second system with a second distance between the PF 130 and engine block cylinder head assembly 104, where the second distance is greater than the first distance. In the example, the same model is used by the control module 110 in both configurations, using the same exhaust components, where a correction for heat loss is made to adjust the set point temperature determination. Thus, the model provides a desired set point temperature independent of a distance between the PF 130 and engine block cylinder head assembly 104. The provided desired set point temperature may then be used to control a regeneration process. Accordingly, an embodiment of the system and method provides improved flexibility and well as improved accuracy for determining regeneration set point temperatures for various configurations, where the desired set point temperature improves regeneration to improve exhaust aftertreatment system operation.

The determination of the regeneration set point temperature is used by a control module 110 to send control commands to regeneration system components, such as commands that control operation of the HCI 154, heating device 150, post-injection of fuel into cylinders 114 by a fuel injector or a combination thereof. For example, a control command may change current provided to the heating device 150 based on the determined set point temperature and the measured temperature at the PF 130. The current may be changed by the control module 110 sending a signal that controls current from the power source 152. In another example, a control command may change hydrocarbon flow from an HCI 154 into the exhaust system 106 or fuel flow from the fuel system 156 into the cylinders 114 based on the determined set point temperature. The flow rate may be changed by the control module 110 sending a signal to change a position of a valve in fuel system 156 or HCI 154. Thus, the determined set point temperature using the model and control module 110 provides improved accuracy which leads to improved regeneration efficiency and control of regeneration and associated system components.

Figure 2:
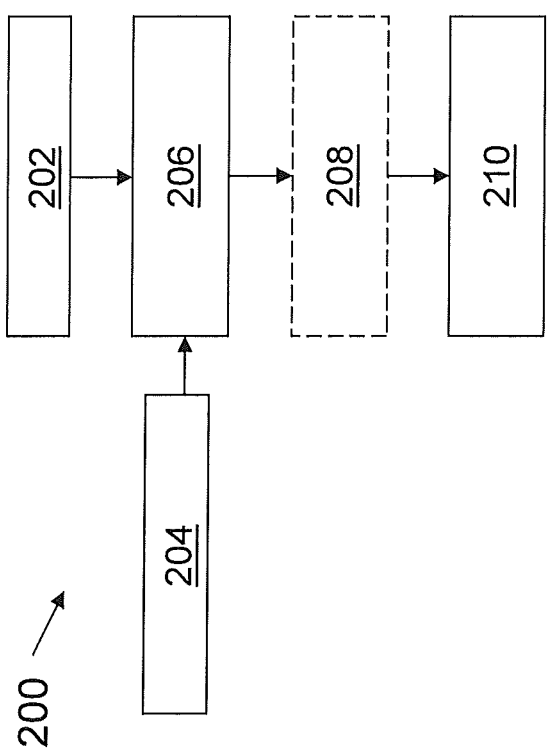
FIG. 2 is a diagram of an exemplary method and system for regeneration of a particulate filter in the exemplary internal combustion engine and associated exhaust system shown in FIG. 1.
Figure 3:
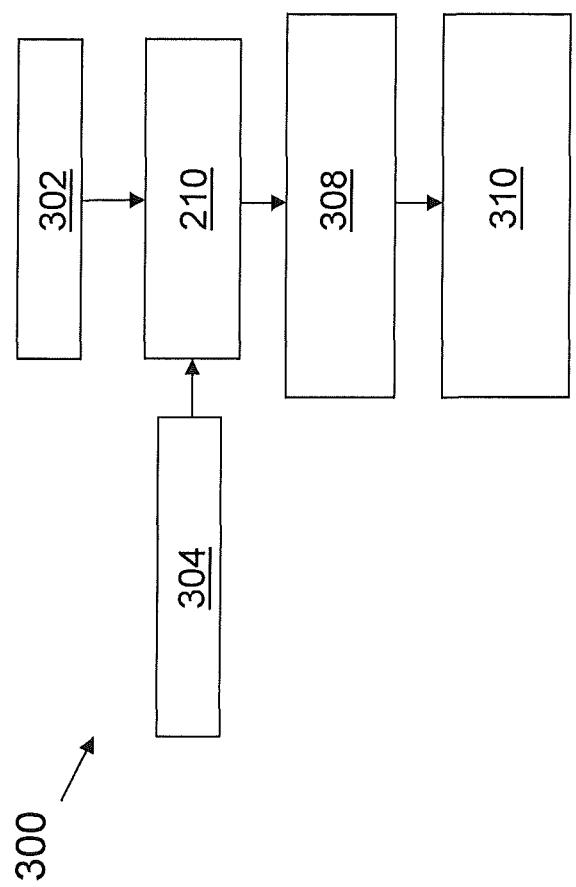
FIG. 3 is a diagram of an exemplary method and system for regeneration of a particulate filter in the exemplary internal combustion engine and associated exhaust system shown in FIG. 1.

FIG. 2 is a flow chart of an exemplary process 200 for regeneration in an exhaust aftertreatment system, such as exhaust system 106 (FIG. 1). The depicted flowcharts in FIGS. 2 and 3 illustrate the architecture, functionality, and operation of possible implementations of systems and methods according to various embodiments of the process. It should be noted that, in some implementations, the functions noted in the blocks may occur out of the order shown. Further, additional blocks may be added to or removed from the process in certain embodiments to accommodate certain applications. Parameters determined by and used in the process 200 may be determined by any suitable method, such as modeling, equations, logged data, sensor measurements or any combination thereof. In block 202, an oxygen mass flow rate received from an internal combustion engine is determined. In block 204, a particulate mass within a particulate filter is determined. The particulate mass may be measured directly or inferred by equations from other measurements, such as by using pressure measurements that provide a backpressure value that is used to determine particulate mass. In an embodiment, the oxygen mass flow rate from block 202 and the particulate mass from block 204 are determined and received as inputs to block 206 where the inputs are used to determine a the particulate burn rate. In an embodiment, a temperature at the PF inlet 144 is determined to correlate to the determined particulate burn rate for the specified oxygen mass flow rate and particulate mass. A range of parameters are tested, where the oxygen mass flow rate, particulate mass and/or PF inlet 144 temperature are varied to provide burn rate information. Desired particulate burn rates may be the determined rates that are relatively high values, as compared to the entire set of logged particulate burn rates. In addition, desired particulate burn rates do not adversely affect exhaust system components and do not lead to a runaway condition. In an embodiment, the desired particulate burn rate is the burn rate at which a shorter duration and efficient regeneration process without a runaway condition occurs. In an embodiment, the time for an efficient regeneration process may be reduced to the shorter duration or time period to avoid or reduce the probability of adversely affecting operator experience. In addition, the reduced regeneration period provides regeneration that does not exceed a certain temperature for exhaust components, above which temperature operation may cause material fatigue and wear of components, such as oxidation or other high temperature degradation processes. In one embodiment, the block 206 includes using the inputs as well as data describing operating specifications for exhaust system components to determine burn rates and correlating PF inlet 144 temperatures based on the inputs. Specifications relating to exhaust system components may describe the safe operating temperatures for the components. The resulting logged data may be used to provide a model, such as a look-up table, based on the logged data from testing, determined parameters, and equipment specifications to a desired set point temperature for exhaust gas entering PF inlet 144 for a variety of operating conditions and configurations.

With continued reference to FIG. 2, in block 208, a filter or temperature ramp may be applied to the model from block 206 to adjust for certain conditions, components and configurations. For example, to protect the exhaust components, a temperature ramp is applied to the model from block 206 to prevent the PF inlet 144 temperature from increasing at a rate that is greater than two degrees per second. Thus, for inputs to the model that would result in a set point temperature output that would cause a temperature increase of greater than two degrees per second, the set point temperature output is adjusted to keep the temperature increase rate below two degrees per second. In addition, a filter may be applied to the model, where the filter may filter the input data to ensure that anomalous data does not cause an incorrect set point temperature determination. In block 210, the model is provided to determine a desired set point temperature for exhaust gas received at the PF inlet 144. The model uses determined parameters as inputs, such as oxygen mass flow (block 202) and soot mass (block 204). In an embodiment, the exhaust mass flow is calculated from the Mass Airflow (MAF) sensor which measures fresh air coming into the engine and the amount of fuel injected into the engine. In an embodiment, the exhaust mass flow rate determination provides flexibility to determine the appropriate conditions (e.g., burn rate, temperature) for the regeneration process. Thus, the model determined using the process 200 is determined by testing and logging data, where the model may be used in an internal combustion engine in a vehicle to determine the exhaust gas set point temperature for efficient regeneration. The set point temperature is used to provide a corresponding signal from a controller that controls a parameter for the regeneration system to achieve the set point temperature.

FIG. 3 is a flow chart of an exemplary process 300 for regeneration in an exhaust aftertreatment system, such as exhaust system 106 (FIG. 1). In an embodiment, the process 300 may include parameter inputs determined by other processes, such as an input from block 210 of process 200. In block 302, an oxygen mass flow rate received from an internal combustion engine is determined. In block 304, a particulate mass within a particulate filter is determined. In block 210, the parameters from blocks 302 and 304 are received and used to determine a desired set point temperature for exhaust gas entering inlet 144 of the PF 130. The model used by the controller in block 210 determines the desired set point temperature for an efficient regeneration based on the inputs of blocks 302 and 304. As described above, the model determines the desired set point temperature that will provide a short duration and efficient regeneration process for the conditions without causing a runaway condition. In block 308, filters, corrections and/or compensation factors may be applied to the exhaust gas set point temperature determined in block 210. For example, correction factors may be applied to the base set point temperature based on heat loss in the exhaust system, particulate mass, regeneration time, environmental temperature and time at idle, thus producing a corrected set point temperature. In embodiments, the factors applied in block 308 are optionally included in the process. Specifically, in some embodiments, the set point temperature determined in block 210 does not need filtering or correction provided in block 308. In block 310, the set point temperature from block 308 is used by the controller to generate a signal that is communicated to control a parameter of a regeneration system. The control signal causes the exhaust gas temperature to be altered and closer to the desired set point temperature, thus improving the efficiency of the regeneration process.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A system comprising:
   a particulate filter coupled to a conduit that receives an exhaust gas from an internal combustion engine; and
   a controller coupled to an oxygen mass flow sensor, the controller comprising a processor coupled to a memory, the controller configured to perform a method, the method comprising:
   determining a mass flow rate of oxygen received by the internal combustion engine;
   determining a particulate mass within the particulate filter;
   providing information describing desired set point temperatures corresponding to selected oxygen mass flow rates and selected particulate mass values;
   determining a temperature set point for exhaust gas entering the particulate filter that is independent of a distance between the internal combustion engine and the particulate filter based on the mass flow rate of oxygen, the particulate mass and the information describing desired set point temperatures corresponding to selected oxygen mass flow rates and selected particulate mass values;

determining a correction value based on heat loss in the exhaust system;

correcting the determined temperature set point by applying the correction value to the determined temperature set point; and communicating a signal, from the controller, to control a parameter for at least one selected from the group consisting of: a hydrocarbon injector, a heating device and a fuel injector configured to provide hydrocarbon post-injection to a cylinder of the internal combustion engine, the controlling based on the corrected temperature set point.

2. The system of claim 1, wherein the parameter comprises at least one selected from the group consisting of: a hydrocarbon injector flow rate, a fuel flow rate for post-injection and a current or voltage to the heating device.

3. The system of claim 1, wherein providing information describing desired set point temperatures corresponding to selected oxygen mass flow rates and selected particulate mass values comprises providing a table to the controller describing desired set point temperatures corresponding to selected oxygen mass flow rates and selected particulate mass values, wherein the desired set point temperatures are determined by test data for the exhaust system at the selected oxygen mass flow rates and selected particulate mass values.

4. The system of claim 1, wherein providing information describing desired set point temperatures corresponding to selected oxygen mass flow rates and selected particulate mass values comprises providing the desired set point temperatures based on desired particulate burn rates corresponding to the selected oxygen mass flow rates and selected particulate mass values.

5. The system of claim 1, wherein determining the particulate mass within the particulate filter comprises determining the particulate mass by a sensor coupled to the controller.

6. The system of claim 1, wherein determining the mass flow rate of oxygen received by the internal combustion engine comprises determining the mass flow rate of oxygen by a sensor coupled to the controller.

7. The system of claim 1, wherein providing information describing desired set point temperatures corresponding to selected oxygen mass flow rates and selected particulate mass values comprises providing a table to the controller describing desired set point temperatures independent of a distance between the particulate filter and the internal combustion engine.

8. The system of claim 1, wherein the method further comprises performing a regeneration of the particulate filter based on the corrected temperature set point, wherein the regeneration reduces the particulate mass in the particulate filter.

9. A vehicle comprising:
an internal combustion engine;
a particulate filter coupled to a conduit that receives an exhaust gas from the internal combustion engine; and
a controller coupled to an oxygen mass flow sensor, the controller comprising a processor coupled to a memory, the controller configured to perform a method, the method comprising:
determining a mass flow rate of oxygen received by the internal combustion engine;
determining a particulate mass within the particulate filter;
providing information describing desired set point temperatures corresponding to selected oxygen mass flow rates and selected particulate mass values;
determining a temperature set point for exhaust gas entering the particulate filter that is independent of a distance between the internal combustion engine and the particulate filter based on the mass flow rate of oxygen, the particulate mass and the information describing desired set point temperatures corresponding to selected oxygen mass flow rates and selected particulate mass values;
determining a correction value based on heat loss in the exhaust system;
correcting the determined temperature set point by applying the correction value to the determined temperature set point; and
communicating a signal, from the controller, to control a parameter for at least one selected from the group consisting of: a hydrocarbon injector, a heating device and a fuel injector configured to provide hydrocarbon post-injection to a cylinder of the internal combustion engine, the controlling based on the corrected temperature set point.

10. The vehicle of claim 9, wherein the parameter comprises at least one selected from the group consisting of a hydrocarbon injector flow rate, a fuel flow rate for post-injection and a current or voltage to the heating device.

11. The vehicle of claim 9, wherein providing information describing desired set point temperatures corresponding to selected oxygen mass flow rates and selected particulate mass values comprises providing a table to the controller describing desired set point temperatures corresponding to selected oxygen mass flow rates and selected particulate mass values, wherein the desired set point temperatures are determined by test data for the exhaust system at the selected oxygen mass flow rates and selected particulate mass values.

12. The vehicle of claim 9, wherein providing information describing desired set point temperatures corresponding to selected oxygen mass flow rates and selected particulate mass values comprises providing the desired set point temperatures based on desired particulate burn rates corresponding to the selected oxygen mass flow rates and selected particulate mass values.

13. A method for controlling regeneration for an exhaust system of an internal combustion engine, wherein the exhaust system comprises a particulate filter, the method comprising:
determining a mass flow rate of oxygen received by the internal combustion engine;
determining a particulate mass within the particulate filter;
providing information describing desired set point temperatures corresponding to selected oxygen mass flow rates and selected particulate mass values;
determining a temperature set point for exhaust gas entering the particulate filter that is independent of a distance between the internal combustion engine and the particulate filter based on the mass flow rate of oxygen, the particulate mass and the information describing desired set point temperatures corresponding to selected oxygen mass flow rates and selected particulate mass values;
providing the determined temperature set point to a controller coupled to the exhaust system, the controller comprising a processor coupled to a memory;
determining, by the controller, a correction value based on heat loss in the exhaust system;
correcting the determined temperature set point by applying the correction value to the determined temperature set point;

communicating a signal, from the controller, to control a parameter for at least one selected from the group consisting of: a hydrocarbon injector, a heating device and a fuel injector configured to provide hydrocarbon post-injection to a cylinder of the internal combustion engine, the controlling based on the corrected temperature set point; and performing a regeneration of the particulate filter based on the corrected temperature set point, wherein the regeneration reduces the particulate mass in the particulate filter.

14. The method of claim 13, wherein the parameter comprises at least one selected from the group consisting of: a hydrocarbon injector flow rate, a fuel flow rate for post-injection and a current or voltage to the heating device.

15. The method of claim 13, wherein providing information describing desired set point temperatures corresponding to selected oxygen mass flow rates and selected particulate mass values comprises providing a table describing desired set point temperatures corresponding to selected oxygen mass flow rates and selected particulate mass values, wherein the desired set point temperatures are determined by test data for the exhaust system at the selected oxygen mass flow rates and selected particulate mass values.

16. The method of claim 13, wherein providing information describing desired set point temperatures corresponding to selected oxygen mass flow rates and selected particulate mass values comprises providing the desired set point temperatures based on desired particulate burn rates corresponding to the selected oxygen mass flow rates and selected particulate mass values.

17. The method of claim 13, wherein determining the particulate mass within the particulate filter comprises determining the particulate mass by a sensor coupled to the controller.

18. The method of claim 13, wherein determining the mass flow rate of oxygen received by the internal combustion engine comprises determining the mass flow rate of oxygen by a sensor coupled to the controller.

19. The method of claim 13, wherein providing information describing desired set point temperatures corresponding to selected oxygen mass flow rates and selected particulate mass values comprises providing a table to the controller describing desired set point temperatures independent of a distance between the particulate filter and the internal combustion engine.

20. The method of claim 1, further comprising:
determining correction values based on particulate mass, regeneration time, environmental temperature and time at idle; and
correcting the determined temperature set point further by applying the correction values to the determined temperature set point.

* * * * *